United States Patent [19]
Blake et al.

[11] 3,775,217
[45] Nov. 27, 1973

[54] CONTINUOUS PROCESS AND APPARATUS FOR LAMINATING AN ORIENTED THERMOPLASTIC FILM TO WET CELLULOSE

[75] Inventors: Michael Orren Blake; Paul Z. Larson, both of Clinton, Iowa

[73] Assignee: E. I. du Pont de Nemours and Company, Wilmington, Del.

[22] Filed: Oct. 12, 1971

[21] Appl. No.: 188,210

[52] U.S. Cl.............. 156/308, 156/322, 156/324, 156/331, 156/497, 156/551, 161/232, 161/249, 161/402, 161/411, 264/83
[51] Int. Cl........................... B32b 27/08, C09j 5/02
[58] Field of Search................ 156/307, 308, 322, 156/324, 331, 497, 551; 161/232, 249, 402, 411; 264/83

[56] References Cited
UNITED STATES PATENTS

| | | | |
|---|---|---|---|
| 2,975,093 | 3/1961 | Park | 161/249 X |
| 2,999,782 | 9/1961 | Justice et al. | 161/249 |
| 3,262,829 | 7/1966 | Conti | 156/307 |
| 3,274,004 | 9/1966 | Curler et al. | 99/171 |
| 3,322,593 | 5/1967 | Conti | 156/307 |
| 3,365,348 | 1/1968 | Conti | 156/308 |
| 3,445,324 | 5/1969 | Curler et al. | 161/165 |
| 3,515,780 | 6/1970 | O'Connell et al. | 264/342 |
| 3,607,544 | 9/1971 | Earner et al. | 156/307 |
| 3,513,055 | 5/1970 | Brader et al. | 156/307 |

Primary Examiner—Alfred L. Leavitt
Assistant Examiner—Robert A. Dawson
Attorney—Louis Del Vecchio

[57] ABSTRACT

A process and apparatus for laminating an oriented, surface-conditioned, thermoplastic film to a wet cellulose film by (a) heating and steam-sparging the thermoplastic film; (b) impregnating the wet cellulose film with an anchoring agent when the cellulose film contains about 180 to 350 % moisture; (c) drying the cellulose film to a moisture content of about 10 to 40 weight per cent; (d) laminating the surface-conditioned, steam-sparged side of the thermoplastic film to the impregnated side of the cellulose film when the cellulose film has a moisture content of about 10 to 40 weight per cent conveniently carried out by simultaneously passing the two films through a set of heated nip rolls; then (e) drying the laminated film structure until the cellulose film contains about 3 to 8 weight per cent moisture where the weight per cent moisture is based on the weight of the moisture-free cellulose content thereof. This laminated film structure can be coated with a vinylidene chloride type coating making it particularly useful in packaging dry foodstuffs, such as cereals and snacks.

12 Claims, 1 Drawing Figure

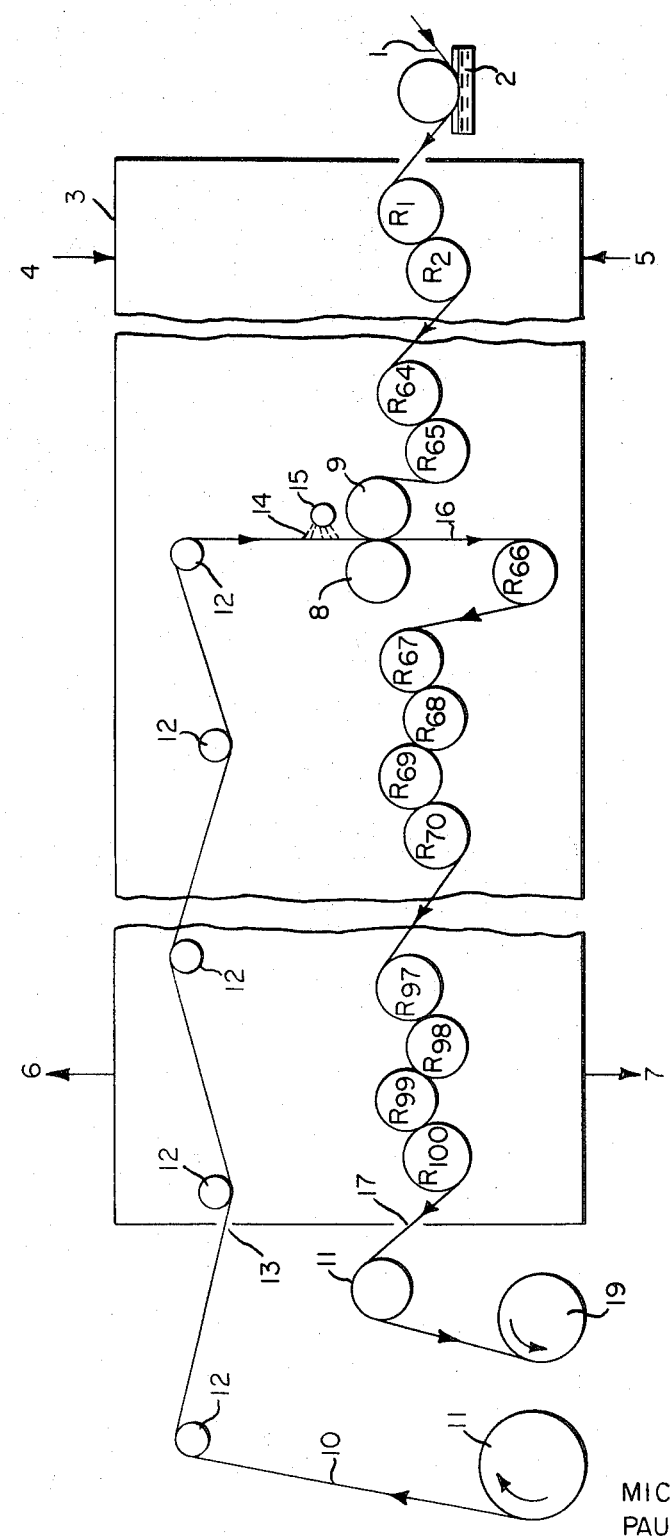

CONTINUOUS PROCESS AND APPARATUS FOR LAMINATING AN ORIENTED THERMOPLASTIC FILM TO WET CELLULOSE

BACKGROUND OF THE INVENTION

This invention relates to a process and apparatus for preparing film laminates of cellulose and at least one thermoplastic film. These film laminates can be coated with vinylidene chloride type coatings making them particularly useful in packaging dry foodstuffs such as cereals and snacks.

New packaging materials are constantly being developed to satisfy the demand for food packaging films. The wide variety and types of food items to be packaged, however, generates a corresponding requirement for a wide variety of performance characteristics for the packaging films employed. In addition, the packaging films must also lend themselves to the particular packaging techniques to be used. Lastly, the film structure must provide the desired performance at a cost which is sufficiently low as to be practicable.

One type of versatile packaging material known to the art is a laminar structure of cellulose and a thermoplastic film, e.g., polyethylene, polypropylene and polyethylene terephthalate. It is also known to modify or improve the surface properties of such a laminar structure by overcoating the laminar structure with various conventional coatings such as those prepared using vinylidene chloride.

Such laminar film structures are very effective in use and have gained commercial acceptance; therefore, there is a continuous effort made to improve the process of making such a laminar film structure.

SUMMARY OF THE INVENTION

Accordingly, the present invention provides an improved process with apparatus for continuously laminating in a cellophane dryer an oriented, surface-conditioned, thermoplastic film to a cellulose film impregnated with an anchoring agent consisting essentially of:

a. advancing a moisture-laden, gel-regenerated, cellulose film;

b. impregnating the cellulose film with an anchoring agent when the cellulose film has a moisture content of about 180 to 350 weight per cent;

c. partially drying the impregnated cellulose film to a moisture content of about 10 to 40 weight per cent;

d. advancing an oriented, surface-conditioned, thermoplastic film;

e. optionally heating the thermoplastic film to a temperature of about 50° to 60°C.

f. steam-sparging the conditioned surface of the thermoplastic film with steam at a temperature of about 125° to 145° C. and a pressure of about 12 to 20 psig;

g. laminating the steam-sparged thermoplastic film to the partially dried cellulose film having a moisture content of about 10 to 40 weight per cent by simultaneously passing the thermoplastic film and the cellulose film through nip rolls with the impregnated side of the cellulose film contacting the surface-conditioned, steam-sparged side of the thermoplastic film wherein the temperature of at least one nip roll is about 90° to 220° C. and the pressure in the nip is at least about 50 pounds per linear inch; and thereafter h. drying the laminated structure until the cellulose film contains about 3 to 8 weight percent moisture where all percentages of moisture used above are based on the weight of the moisture-free cellulose content thereof.

BRIEF DESCRIPTION OF THE DRAWING

The drawing is a schematic flow diagram of the preferred process diagramatically depicting the preferred mens for carrying out this process.

DETAILED DESCRIPTION OF THE INVENTION

The regenerated cellulose film can be prepared in any conventional manner, such as from cellulose xanthate by the viscose process, from cuprammonium cellulose, or from solutions of cellulose in salt solutions, such as calcium thiocyanate, by methods well known in the art. The method of preparation is not critical. It can be softened with any of the known softeners, such as glycerine, propylene glycol, urea, polyethylene ether glycols, etc. When the regenerated cellulose sheet is prepared by the viscose process, it is preferred that it be prepared by a casting process which yields a strong sheet such as described in U.S. Pat. No. 3,073,733 to Mitchell.

Before regenerated cellulose film is dried for use, it is laden with water in amounts varying from about 180 to 350% water moisture based upon the moisture-free cellulose content of the cellulose film. Lamination of the cellulose film to the thermoplastic film takes place before the cellulose film is completely dried for use; however, even before any drying takes place, the cellulose film is impregnated with an anchoring agent. This occurs in the following manner.

The cellulose film having a moisture content of about 180 to 350 weight per cent, is impregnated with an anchoring agent which can be a polyalkyleneimine having from 2 to 8 carbon atoms, such as polyethyleneimine, or a thermosetting resin such as urea-aldehyde, melamine-aldehyde, melamine-urea-aldehyde, melamine-formaldehyde-polyalkylenepolyamine, guanidine-urea-aldehyde, guanidine-carbamide-aldehyde, or mixtures thereof. See, for example, Charch et al., U.S. Pat. No. 2,159,007; Ellis, U.S. Pat. No. 2,523,868; and Chapman, U.S. Pat. No. 2,533,557. The amount of anchoring agent can range from about 0.05 to 2%, preferably 0.1 to 0.5%, of the total weight of the cellulose film layer and is applied to the cellulose film by passing the film through a bath containing the anchoring agent.

After impregnation, the cellulose film is dried to a moisture content of about 10 to 40 weight percent and is now ready to be laminated to a thermoplastic film.

The thermoplastic films that can be laminated to the wet cellulose can be prepared from a number of different types of polymers such as polyethylene, polypropylene, polyethylene terephthalate, polyamides, polyvinyl chloride; copolymers such as polyethylene and an α-monoolefin, e.g., octene, butene, or various blends of polymers such as high density polyethylene and low density polyethylene. The polymer is selected according to the desired end use of the laminate. For packaging dry foodstuffs such as snacks, the film is preferably prepared from polyethylene, polypropylene or polyethylene terephthalate.

The thermoplastic film is molecularly oriented and this can be accomplished by uniaxial or biaxial stretching of the film during the formation of the film. If the film is biaxially oriented, it can be symmetrically or asymmetrically oriented. Preferably, the film is biaxially oriented with the degree of orientation equivalent to stretching at least 2X, preferably at least 3X, in each direction; it can be as high as 7X or more. The film should be dimensionally stable; it should exhibit a shrinkage of less than 5% when measured at 70° C. Preferably, the dimensional stability should be sufficient to exhibit a shrinkage of less than 0.5% measured at 100° C. An exemplary range of film thickness is from about 0.2 to 5 mils.

The oriented thermoplastic film must be conditioned before lamination to the cellulose film. Suitable conditioning techniques include flame treatment which consists of subjecting the surfaces to the action of a burning gaseous flame. This technique is described in Swerlick, U.S. Pat. No. 3,459,582, at columns 3 and 4 thereof. Another method of conditioning this film is by the treatment with electrical discharge. This may be accomplished conveniently with a Lepel High Frequency Laboratory Model HFSG high frequency (450 Kilohertz) spark generator by passing the surfaces to be treated about 0.04 inch from the stationary high voltage electrodes of the Lepel generator supplied with approximately 1.3 amperes (r.m.s.) of current. The film surfaces to be treated may be advanced at speeds varying from 10 to 200 feet per minute or more to provide an effective time of treatment of about $4 \times 10^{-4}$ second. See the U.S. Pats. to Traver, Nos. 3,018,189 and 3,113,208. A reasonable degree of treatment is obtained if the film surface is exposed to about 20 to 500 milliwatt hours per square foot. It is preferred that the thermoplastic film be treated while passing over a roll heated between about 75° and 100° C.

Immediately prior to lamination, the thermoplastic film can optionally be preheated to a temperature of about 50° to 60° C. and the surface to be laminated is sparged with practically saturated steam. Effective results have been accomplished by steam sparging the thermoplastic film about 4 to 6 inches from the laminated nip using steam at a temperature of about 125°–145° C., preferably about 132°–138° C. and a pressure of about 12–20 psig. Now the thermoplastic film is ready to be laminated to the cellulose film.

Lamination of the preconditioned and steam-sparged surface of the thermoplastic film to the impregnated side of the cellulose film follows and is conveniently accomplished by bringing the films together between a pair of nip rolls.

One of the nip rolls preferably has a metal surface and is heated by conventional means known to those skilled in the art. The other roll preferably has an elastomeric peripheral coating such as a coating of chlorosulfonated polyethylene elastomer (HYPALON, available from E.I. du Pont de Nemours and Company). It is preferred that the elastomeric coating have a hardness of about 90 to 95 Durometer A. The elastomeric covered roll need not be heated and can, if desired, be cooled. In a typical operation, the cellulose film is run over the heated metal roll and the oriented thermoplastic film is run over the elastomeric covered roll. The heated drum is conventionally adapted to be heated from about 90° to 220° C. producing a film surface temperature of about 88° to 105° C. and, preferably, 95° to 100° C. The surface temperature of the film will, of course, be influenced by the speed of lamination.

The pressure used in the nip must be high enough to effect lamination, but not so high that it damages the films. It has been found that a nip pressure of at least about 50 pounds per linear inch works satisfactorily. To some extent, the higher the moisture content in the cellulose layer, the less pressure is needed.

The speed of lamination typically ranges from about 50 to 600 feet per minute with about 100 to 300 feet per minute being preferred. The residence time of the laminated film in the nip is a function of the hardness of the elastomer and the speed of lamination. It is ordinarily at least one millisecond and preferably at least 2 milliseconds; the upper limit on residence time is not particularly critical, e.g., up to 20 milliseconds or more.

After the films have been laminated, the cellulose film still being in a partially wet condition, it is necessary to continue drying the laminated structure to remove the additional moisture provided by the steam sparge and to carry out the normal drying of the cellulose film. The laminate is dried until the cellulose film layer contains about 3–8% moisture based on the moisture-free cellulose content thereof.

The laminates prepared according to the present invention are useful in packaging foodstuffs. For some packaging need, however, it is necessary to impart barrier properties to the film and, typically, this can be done by coating one or both surfaces of the laminated structure with a conventional saran coating.

A particularly useful saran coating is comprised of a copolymer obtained by polymerizing a mixture of between about 80 and about 96.5 parts by weight (preferably 88 to 93 parts) of vinylidene chloride, between about 0.1 and about 5 parts by weight (preferably between 0.2 to 0.5) of either itaconic acid or acrylic acid, with the remainder being between about 3 to about 19.9 parts by weight of at least one other monomer copolymerizable therewith such as acrylonitrile, alkyl esters of either acrylic or methacrylic acids having from 1 to 18 carbon atoms in the alkyl group thereof, phenyl methacrylate, cyclohexyl methacrylate, p-cyclohexylphenyl methacrylate, methacrylonitrile, methyl vinyl ketone, and vinyl chloride.

The vinylidene chloride polymer is dissolved in an organic solvent such as mixtures of tetrahydrofuran (THF) and toluene (e.g., 60 to 70% THF) to form the coating bath. It is preferred to use polymer concentrations between about 15 and 30% polymer by weight of the total bath. The bath can include behenic acid in amounts ranging from about 1% to 5% of the total bath weight. Another ingredient in the bath is a slip agent such as finely divided particulate inorganic materials, e.g., magnesium silicate, bentonite clay, mica, etc. See, Owens U.S. Pat. No. 3,428,483. These agents are present in amounts ranging from about 0.2% to 2% of the total weight of the coating bath. Optional ingredients include waxes such as glyceride esters, microcrystalline waxes, paraffin waxes, the high molecular weight amides such as stearamide, N,N'-ethylene bisoleamide, and the like. Typical amounts range from about 1% to 6% of the weight of the coating bath.

The laminate of the cellulose film to the oriented polyethylene terephthalate film described above is processed through the coating bath. Before coating, this laminate can be run through a steam bath to increase the moisture content of the laminate, particularly the cellulose layer. The coating bath described above is contained within a dip tank and the laminate is run through the bath in such a way that both surfaces of the laminate are coated. The laminate is then run upward between a pair of doctor rolls which are set at a predetermined position depending upon the amount of coating that is desired on the laminate. The laminate so coated then runs between a series of smoothing rolls and then upward through a heating zone to remove the solvent and to dry the film. A typical apparatus for conducting this stage of the coating process is depicted in Wallenfels, U.S. Pat. No. 3,458,334, and other prior art sources. The film speed through the bath typically varies between 50 to 800 feet per minute.

The coating weight is preferably about 1.4–3.0 grams/square meter on a side. If the weight of the coating is below about 1.2 grams/square meter on a side, the distribution of the coating may lack uniformity. If the coating weight is above about 4 grams/square meter on a side, the solvent retention may be excessive.

Apparatus for carrying out the process of the present invention wherein an oriented, surface-conditioned, and steam-sparged thermoplastic film is laminated to an impregnated, wet, cellulose film comprises:

a. means for advancing a moisture-laden, gel-regenerated, cellulose film;
b. means for impregnating the cellulose film with an anchoring agent when the cellulose film has a moisture content of about 180 to 350 weight per cent;
c. means for partially drying the cellulose film to a moisture content of about 10 to 40 weight per cent;
d. means for advancing an oriented, surface-conditioned, thermoplastic film;
e. optional means for heating the thermoplastic film to a temperature of about 50° to 60° C;
f. means for steam-sparging the thermoplastic film;
g. means for laminating the steam-sparged thermoplastic film to the cellulose film having a moisture content of about 10 to 40 weight per cent by simultaneously passing the thermoplastic film and the cellulose film through nip rolls with the impregnated side of the cellulose film contacting the surface-conditioned, steam-sparged side of the oriented thermoplastic film wherein the temperature of at least one nip roll is about 90° to 230° C. and the pressure in the nip is at least about 50 pounds per linear inch; and
h. means for drying the laminated film structure until the cellulose film contains about 3 to 8 weight per cent moisture, where all percentages of moisture are based on the weight of the moisture-free cellulose content thereof.

The drawing shows a preferred mechanical embodiment for carrying out the process of this invention. Referring to the drawing, a moisture-laden, gel-regenerated, cellulose film 1 having a moisture content of about 180 to 350 weight per cent of the moisture-free cellulose content is impregnated with an anchoring agent by passing the cellulose film through a bath 2 containing the anchoring agent. Thereafter, the impregnated cellulose film is fed in a continuous manner into a drying chamber 3.

A useful drying chamber is disclosed in U.S. Pat. No. 3,515,780 hereby incorporated by reference.

In the drying chamber 3, the cellulose film 1 passes over heated drying rolls designated by the symbol R that are cylindrically shaped and suitably journaled for rotation. The drying rolls can be rotated by any suitable means such as a gear train, belts and pulleys, or electrical speed control devices. The specific arrangements of the rolls is not critical and any arrangement that aids in maintaining the cellulose film in intimate contact with the heated roll surfaces is satisfactory. The total number of heated rolls used is dependent upon the number of rolls needed to obtain satisfactory drying performance consistent with economic conditions.

The drying rolls can be heated by conventional means such as hot water or steam circulating through each individual drying roll. The drying rolls are heated to a temperature between about 220° F. and 250° F. In addition, heated air is continuously circulated through the drying chamber; entering the drying chamber through intake plenums 4 and 5 and leaving through exit plenums 6 and 7. Typically, the air is heated to a temperature of about 185° F. and, after circulating through the dryer, the hot air along with vaporized moisture leaves the drying chamber through exit plenums 6 and 7.

When the cellulose film has been dried to a moisture content of about 10 to 40 weight per cent, it is fed into the nip between nip rolls 8 and 9.

The oriented, surface-treated thermoplastic film 10 is taken from unwind roll 11, passed over idler rollers 12 into heating chamber 2 through an opening in the chamber 13. As the thermoplastic film passes through the heat chamber, it is heated by the convection-heated currents to a temperature of about 50° to 60° C. After heating, the surface of the thermoplastic film to be laminated to the cellulose film is sparged with steam 14 through steam-sparging nozzles contained in manifold 15 just prior to entry of the thermoplastic film into the nip between nip rolls 8 and 9.

The thermoplastic film and the cellulose film meet and are laminated between nip rolls 8 and 9. Nip roll 8 has an elastomeric surface and is not heated, while nip roll 9 has a metal surface and is heated by conventional means not shown.

Thereafter, the laminated films exit the nip wherein the laminated structure 16 is then made to pass over heated drying rolls designated by the symbol R while subjecting the film to the hot circulating air to dry the film until the moisture content of the cellulose film is about 3 to 8 weight percent. The laminated structure exits the heating chamber through exit port 17, passes over a tension winding roll 18 and is wound on winding roll 19.

EXAMPLE I

A regenerated cellulose film is prepared by casting such a film according to the process described in U.S. Pat. No. 3,073,733. The regenerated cellulose film containing about 200% water moisture is cast to a thickness equivalent to 19,500 square inches per pound of cellulose film on a dry basis, and it is impregnated with an anchoring agent of melamine formaldehyde in an amount sufficient to provide 0.18 weight per cent melamine formaldehyde in the dried cellulose film. Thereafter, the moisture-laden, regenerated cellulose film is passed through a conventional softening bath and fed directly into a continuous dryer such as that disclosed in U.S. Pat. No. 3,515,780. In the dryer, the film is dried until it has a water moisture content of about 15% then the film is fed into nip rolls.

Simultaneously, a thermoplastic film prepared from oriented polypropylene having a thickness of about 0.7 mil with one surface preconditioned by subjecting it to an electrical discharge, in the presence of chlorine, is fed into the dryer. In the dryer, the polypropylene film is heated to a temperature of about 60° then subjected to a steam sparge with the steam at a temperature of about 140° C. at a steam pressure of 14 pounds. Immediately after steam-sparging, the polypropylene film is fed into the nip rolls along with the partially dried regenerated cellulose film.

In the nip, the surface-conditioned side of the polypropylene film is made to contact the impregnated side of the regenerated cellulose film and the films are simultaneously fed through the nip rolls wherein one nip roll is heated to a temperature of about 100° C. and the nip pressure is about 50 pounds per linear inch.

The polypropylene film and the regenerated cellulose film exit the nip rolls laminated together, and the laminated structure continues to advance through the drying chamber until the moisture content in the cellulose film is about 4.9 weight per cent.

The dried film was coated with a conventional saran coating on two sides at a thickness of about 1.4 to 1.6 grams per square meter. Thereafer, the bond strength of the laminated films was determined by cutting a sample of film about 1½ in. wide and measuring the amount of force required to separate the laminated structure. Three samples are prepared and the coated, laminated samples exhibit a bond strength at normal room conditions of about 215 g., 201 g., and 201 g. Thereafter, three similar samples are humidified for three days by placing the three samples in a chamber where the relative humidity is maintained at 80% and the temperature is about 72° F. The samples are then removed from the conditioned chamber and the bond strength of the coated, laminated films is measured to be 27 g., 108 g., and 93 g., respectively.

EXAMPLE II

A moisture-laden cellulose film is prepared in the same manner as that described in Example I. The moisture-laden film is passed through a bath containing melamine formaldehyde, an anchoring agent, wherein the melamine formaldehyde present in the bath in an amount sufficient to impregnate the cellulose film with 0.2 weight per cent melamine formaldehyde based on the dry weight of the cellulose film. The moisture-laden, impregnated cellulose film is then fed into a dryer, such as that described in U.S. Pat. No. 3,073,733, and partially dried to a moisture-laden content of about 15 weight per cent, then the partially dried cellulose film is fed into nip rolls.

A thermoplastic film prepared from polyethylene terephthalate characterized as being biaxially oriented, flame-treated on one side and having a thickness of 0.5 mil is fed into the drying chamber heated to a temperature of about 60°, sparged with steam at a pressure of about 14 pounds and a temperature of 140° C., then immediately fed into the nip rolls. In the nip, the flame-treated side of a polyethylene terephthalate film is made to contact the impregnated side of the cellulose film and the two films exit the nip roll laminated together. The laminated structure continues advancing through the drier and exit the drier when the moisture content of the cellulose film is about 3.9 weight per cent.

The dried laminated structure is then coated on both sides with conventional saran coating to a thickness of about 1.6 to 1.8 grams per square meter. Thereafter, the coated, laminated structure is cut into samples, each having a width of about 1½ inches. Six samples at room conditions are tested for bond strength by delaminating the thermoplastic and the cellulose films. The average bond strength on the six samples is 190 grams. Six other samples are placed in a chamber having a relative humidity of about 80% and a temperature of 72° F. for a period of 3 days. Thereafter, these samples are tested for bond strength in the same manner and the average bond strength of the six samples is 130 grams.

EXAMPLE III

A laminated film structure was prepared in the same manner as that described in Example I, except for the following differences. The cellulose film was impregnated with melamine formaldehyde in an amount sufficient to provide 0.19 weight per cent melamine formaldehyde in the dried cellulose film. In addition, the thermoplastic film was 1 mil thick, low density polyethylene flame-treated on one side.

The moisture-laden cellulose film is partially dried to a moisture-laden condition of about 15 weight per cent moisture and is laminated to the preconditioned polyethylene film in the same manner as described in Example I. The laminated structure exits the drying chamber with the cellulose film dried to a moisture content of about 5 weight per cent. Thereafter, the dried film is coated on both sides with a conventional saran coating. Sample strips about 1½ inches wide are tested for bond strengths in the same manner as that described in Example I, wherein at room temperature the bond strengths of two samples are about 390 g. and 450 g. Three film samples are then placed in a condition chamber where the relative humidity is about 81% and the temperature is maintained at about 72° F. for a period of 3 days. Thereafter, the films are tested for bond strength and the bond strength is so high that the films tear before the bond breaks between the laminated films.

We claim:

1. A process for continuously laminating an oriented, surface-conditioned, thermoplastic film to a wet cellulose film consisting essentially of:
   a. advancing a moisture-laden, gel-regenerated, cellulose film;
   b. impregnating the cellulose film with an anchoring agent when the cellulose film has a moisture content of about 180 to 350 weight per cent;
   c. partially drying the impregnated cellulose film to a moisture content of about 10 to 40 weight per cent;
   d. advancing an oriented, surface-conditioned, thermoplastic film;
   e. steam-sparging the conditioned surface of the thermoplastic film with steam at a temperature of about 125° to 145° C. and a pressure of about 12 to 20 psig;
   f. laminating the steam-sparged thermoplastic film to the partially dried cellulose film having a moisture content of about 10 to 40 weight per cent by simultaneously passing the thermoplastic film and the cellulose film through nip rolls with an impregnated side of the cellulose film contacting the surface-conditioned, steam-sparged side of the thermoplastic film wherein the temperature of at least one nip roll is about 90° to 220° C. and the pressure in the nip is at least about 50 pounds per linear inch; and thereafter
   g. drying the laminated structure until the cellulose film contains about 3 to 8 weight per cent moisture where all percentages of moisture used above are based on the weight of the moisture-free cellulose content thereof.

2. The process of claim 1 wherein the thermoplastic film is heated to a temperature of about 50° to 60° C. before it is steam sparged.

3. The process of claim 1 wherein steam sparging of the thermoplastic film takes place about 4 to 6 inches away from the nip prior to the thermoplastic film entering the nip.

4. The process of claim 1 wherein the impregnated anchoring agent is a polyalkylenimine having from 2 to 8 carbon atoms and present in the amount of about 0.05 to 2 weight percent of the total weight of the cellulose film.

5. The process of claim 1 wherein the thermoplastic film is polyethylene.

6. The process of claim 1 wherein the thermoplastic film is polypropylene.

7. The process of claim 1 wherein the thermoplastic film is polyethylene terephthalate.

8. The process of claim 1 wherein the nip roll contacted by the cellulose has a metal surface and is heated to a temperature of about 90° to 220° C. and the nip roll contacting the thermoplastic film is not heated and has an elastomeric cover.

9. The process of claim 6 wherein both nip rolls are heated.

10. An apparatus for laminating an oriented, surface-conditioned and steam-sparged, thermoplastic film to an impregnated, wet, cellulose film comprising:
   a. means for advancing a moisture-laden, gel-regenerated, cellulose film;
   b. means for impregnating the cellulose film with an anchoring agent when the cellulose film has been dried to a moisture content of about 180 to 350 weight per cent;
   c. means for partially drying the cellulose film to a moisture content of about 10 to 15 weight per cent;
   d. means for advancing an oriented, surface-conditioned, thermoplastic film;
   e. means for steam-sparging the thermoplastic film;
   f. means for laminating the steam-sparged thermoplastic film to the cellulose film having a moisture content of about 15 to 40 weight per cent by simultaneously passing the thermoplastic film and the cellulose film through nip rolls with an impregnated side of the cellulose film contacting the surface-conditioned, steam-sparged side of the oriented thermoplastic film wherein the temperature of at least one nip roll is about 90° to 230° C. and the pressure in the nip is at least about 50 pounds per linear inch; and
   g. means for drying the laminated film structure until the cellulose film contains about 3 to 8 weight per cent moisture, where all percentages of moisture are based on the weight of the moisture-free cellulose content thereof.

11. The apparatus of claim 10 including means for heating the thermoplastic film to a temperature of about 50° to 60° C. before it is steam sparged.

12. The apparatus of claim 10 wherein one nip roll has a metal surface and the other nip roll has an elastomeric surface.

* * * * *